United States Patent [19]

Battten

[11] Patent Number: 5,257,557
[45] Date of Patent: Nov. 2, 1993

[54] DRIVEN TOOL LOCKING MECHANISM
[75] Inventor: Ronald W. Battten, Torrance, Calif.
[73] Assignee: VSI Corporation, Chantilly, Va.
[21] Appl. No.: 858,099
[22] Filed: Mar. 26, 1992
[51] Int. Cl.$^5$ .............................................. B25B 23/16
[52] U.S. Cl. ..................................... 81/177.85; 81/55;
81/438; 279/93
[58] Field of Search ................... 81/177.85, 177.2, 55,
81/438; 7/167; 279/93, 138; 408/226, 239 R

[56]     References Cited
       U.S. PATENT DOCUMENTS

| 2,592,978 | 4/1952 | Trimboli | 81/177.2 |
| 2,896,985 | 7/1959 | Braatz | 81/177.85 |
| 3,167,338 | 1/1965 | Troike | 81/177.85 X |
| 4,096,896 | 6/1978 | Engel | 81/177.85 |
| 5,109,735 | 5/1992 | Hart | 81/55 X |

Primary Examiner—James G. Smith
Attorney, Agent, or Firm—Plante, Strauss, Vanderburgh

[57] ABSTRACT

There is disclosed a direct acting lock mechanism to secure a tool within a driver which is useful for securing open channel sockets used to securing aerospace fasteners in a driver. These sockets have a flatted shank, typically hexagonal in cross section, and are received in a socket receptacle of the driver which has a cross section matching that of the shank. In the preferred embodiment, the flatted surfaces of the shank are formed to have substantially coextensive flats which are displaced through an angular increment of at least about 15 degrees. The flats do not extend the entire length of the shank, however, thus providing a thin shelf which has a cross section which matches the internal flatted surface of the socket receptacle of the driver. The driver has an annular internal groove on the inside wall of its socket receptacle and that groove is located at an intermediate height in the socket receptacle to align with the thin shelf of the shank when the socket shank is placed in the socket receptacle of the driver. The shank of the tool is received in the driver receptacle with the shelf received in the groove and locks in the tool upon a slight degree of rotation.

16 Claims, 6 Drawing Sheets

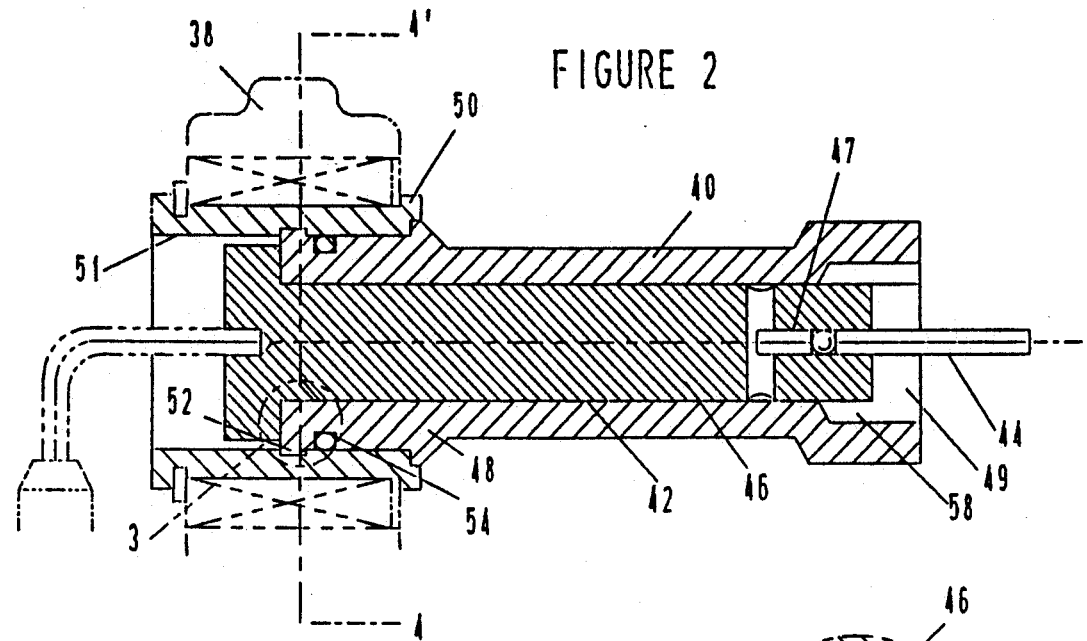

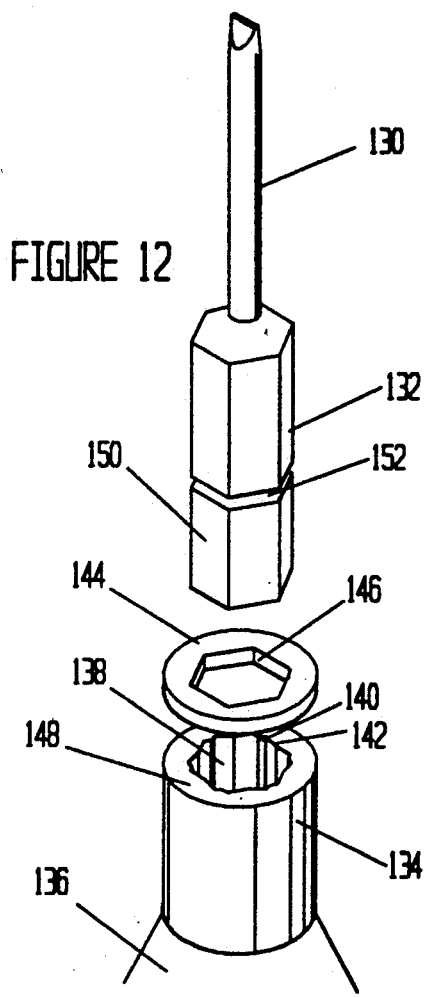

DRIVEN TOOL LOCKING MECHANISM

BACKGROUND OF THE INVENTION

1. Field of Invention

This invention relates to an mechanism for locking a driven tool within a tool driver and, in particular, to a simple mechanism useful for driven sockets used to secure aerospace fasteners.

2. Background of the Invention

Various mechanisms have been proposed and are in use for interlocking a driven tool, such as a socket, drill bit, screw driver, etc., in a tool driver such as a wrench, power driver, etc. The ubiquitous ratchet wrench uses a center release button which is linked to a spring biased detent in the tool driver to interlock interchangeable sockets. The difficulty with this mechanism, in addition to its complexity, is that the detent and lock mechanism overlies the center channel of sockets and precludes introduction of keys such as are used to immobilize a bolt of an aerospace fastener in a non-interference fit. In such applications, it is necessary to secure the bolt with a key which fits into a socket on the end of the bolt, immobilizing the bolt while applying the locking collar of the fastener. In these types of fasteners, the drive socket must have a through central channel for access to the key socket in the end of the bolt.

Various techniques have been used to retain the drive socket of an aerospace fastener tool in its driver, which is typically a power wrench. In one application, the received end of the socket projects through the receptacle of the driver and is retained therein by a C-shaped clip. This mechanism, while quite securely retaining the socket, suffers from time and difficulty in changing sockets in the driver. Other retainers include a pin which extends through aligned bores in the socket and drive shaft, usually used with an elastic retainer about the socket to prevent accidental dislodgement of the pin. Another retainer in use has an annular groove on the shank of the socket which receives one or more spring wires which are constricted when the socket is forcefully set in the socket receptacle of the driver. A difficulty with this mechanism is that the socket can be unintentionally ejected when the user attempts to free a fastener collar which has wedged in the socket. Attempts to eject a wedged collar often require application of a force which exceeds the retention force of the spring wires, resulting in ejection of the entire socket.

In addition to the aforementioned aerospace applications, there are many applications of hand and machine tools in which it is desirable to have a quick change capability permitting the user to interchange sockets without obstructing the central channel through the socket. Other applications include simple and easily loaded screwdriver bits in power drivers.

OBJECTIVES OF THE INVENTION

It is an object of this invention to provide a simple quick-change lock mechanism for locking a tool within a driver.

It is also an object of this invention to provide the aforementioned lock mechanism without obstructing the center channel through a socket member.

It is a further object of this invention to provide the aforementioned lock mechanism with a minimum number of parts.

It is further object of this invention to provide the aforementioned lock mechanism with a direct action, free of springs and detent members.

It is also an object of this invention to provide the aforementioned lock mechanism in a tool system suitable for fastening of aerospace type fasteners.

It is likewise an object of this invention to provide the aforementioned lock mechanism for securing sockets, and other tools such as drill bits and screw drivers.

Other and related objects will be apparent from the following description of the invention.

BRIEF DESCRIPTION OF THE INVENTION

This invention comprises a direct acting lock mechanism to secure a tool within a driver. In its preferred embodiment, the invention is directed for securing open channel sockets useful for securing aerospace fasteners in a driver. These sockets have a flatted shank, typically hexagonal in cross section, and are received in a socket receptacle of the driver which has a cross section matching that of the shank. In accordance with this invention, the flatted surfaces of the shank are formed to have substantially coextensive flats which are displaced through an angular increment of at least about 15 degrees. The flats do not extend the entire length of the shank, however, so as to provide a thin shelf which has a cross section which matches the internal flatted surface of the socket receptacle of the driver.

The driver has an annular internal groove on the inside wall of its socket receptacle and that groove is located at an intermediate height in the socket receptacle to align with the thin shelf of the shank when the socket shank is placed in the socket receptacle of the driver. Alternatively, the driver can have an open side opposite from the side of the socket insertion, and the thin shelf is at the end of the shank, so as to project beyond the open end of the receptacle. The shank of the tool is received in the driver receptacle with the shelf received in the groove, or beyond the opposite open side, and locks in the tool upon a slight degree of rotation. Preferably the hexagonal pattern of the shelf is symmetrical about the axis of the tool, thereby permitting locking of the tool upon rotation of the driver in either direction. Extraction of the tool from the tool driver simply requires releasing the rotational force of the driver and manually rotating the tool to align it to a null position in which the hexagonal pattern of the shelf aligns with the hexagonal flats of the through channel, thereby permitting extraction of the tool. Various preferred and alternate embodiments of the invention are disclosed which can include detent members to lock the tool within the driver and prevent its accidental ejection when the socket is at its null position within the socket receptacle of the driver.

BRIEF DESCRIPTION OF THE DRAWINGS

The invention will be described with reference to the FIGURES, of which:

FIG. 2 is an elevational sectional view of a driver and a socket useful for securing aerospace fasteners, using this invention;

FIG. 3 is an enlarged view of the area within the circled area 3 of FIG. 2;

FIG. 4 is a view along line 4—4' of FIG. 2;

FIG. 5 is a view of the socket end of the socket of FIG. 2;

FIG. 12 is a perspective view of an alternative embodiment of the tool locking mechanism of the invention.

DESCRIPTION OF PREFERRED EMBODIMENTS

Figure 1:
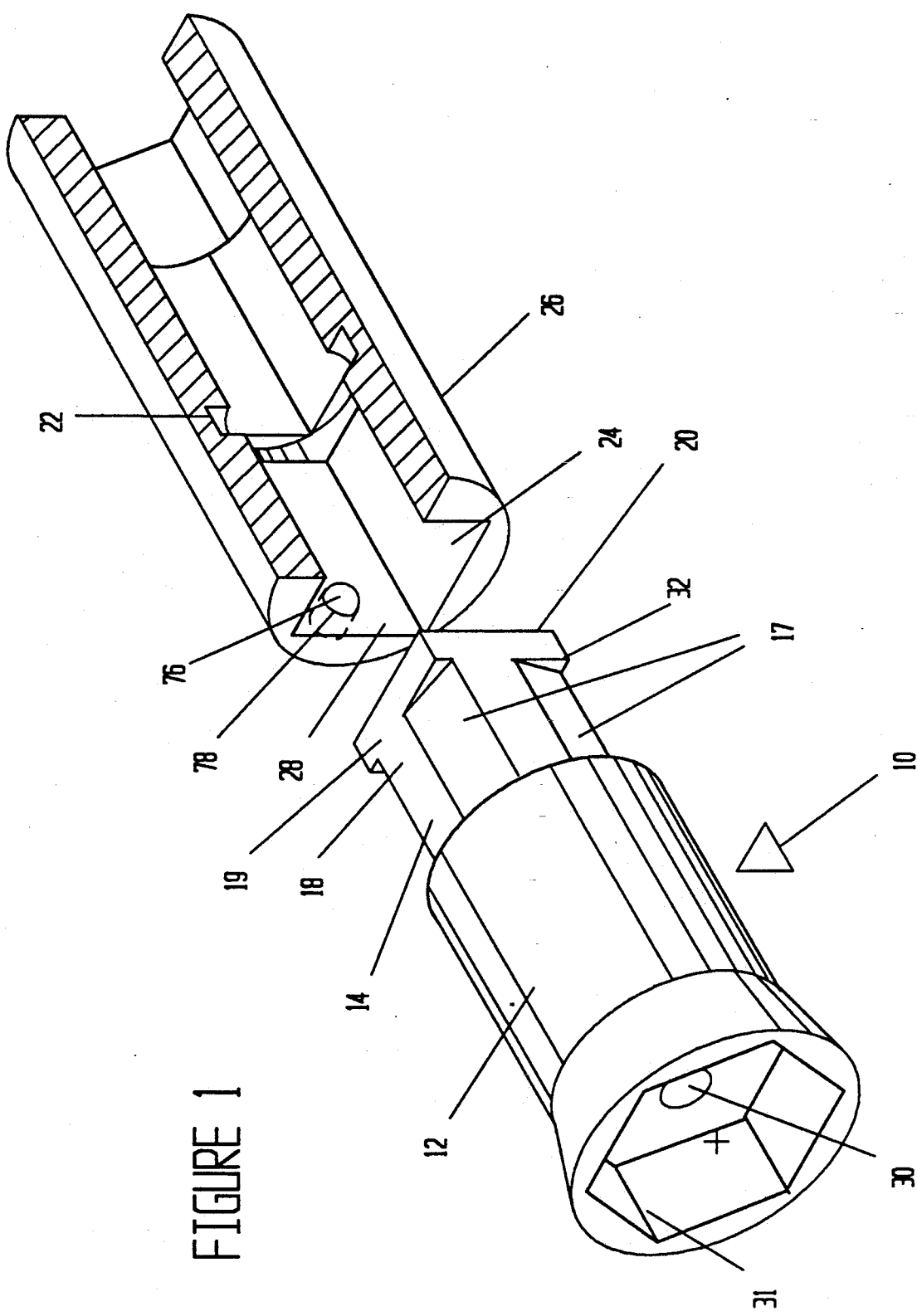
FIG. 1 is a perspective view of a simple embodiment of the invention as applied to a square flatted shank tool.

Referring to FIG. 1, there is illustrated a tool 10 which has a typical tool working end such as a socket 31. It is within the scope of this invention to apply this locking mechanism to other tools, such as a drill bit, screw driver and the like (not shown) which can be located at the end of the tool shaft 12, rather than socket 31. In applications using a center key to immobilize a bolt, such as for aerospace fastener applications, the shaft 12 has a central through bore 30 or channel to receive a key, as described hereinafter.

At the other end of the tool shaft 12, the tool has a flatted shank portion 14, which in the illustration has a generally square cross section with flats 18. The driver 26, which is shown in partial cross section along its length, has a socket receptacle 24 with a square cross section to match the flats 18. Along most of its flatted length, shank portion 14 is formed with additional flats 17 which are angularly displaced from flats 18 by a predetermined angular increment, e.g., from about 5 to about 35 degrees, preferably from about 12 to about 17 degrees, and most preferably 15 degrees, about the longitudinal axis of the tool 10. The flats 17 are substantially, but not entirely, coextensive with flats 18, thereby forming a thin shelf 19 which has the same cross section as the socket receptacle 24 of the driver 26. The shelf 19 can be located at any predetermined distance along the shank; in the illustrated embodiment it is located at the upper end 20 of shank 14, and thus is opposite the working end of the tool 10.

The socket receptacle 24 of the driver 26 has an annular groove 22 at a selected location along its length. The groove 22 is located so as to be axially aligned with the shelf 19 on the end 20 of the tool shank portion 14, when the tool is placed within the socket receptacle 24.

As shown in FIG. 1, the socket receptacle 24 is a square channel 28 which extends entirely through the driver 26, thereby permitting access to the through channel 30 in the tool shaft 12.

From FIG. 1, it can be seen that the application of torque to the tool 10 by the driver 26 will cause relative rotation between the socket receptacle 24 and the tool 10, which will rotate the shelf 19 within the groove 22 in the side walls of the socket receptacle, thereby locking the shelf 19 within the annular groove 22 and preventing extraction of the tool 10 from the socket receptacle 24 of the driver 26. The tool can be readily removed, however, by releasing the torque application, and rotating the socket 10 in the opposite direction, to align the flats of the shelf 19 with the flats of the socket receptacle 24. In this null position, the socket can then be extracted from the driver.

The lock mechanism can be provided with an additional restraint, which is particularly useful with large sockets to avoid their accidental dislodgement. The additional restraint is a spring biased member such as the spring biased ball detent 76, which is seated in a bore 78 in a side wall of the socket receptacle 24 of the driver 26. The ball detent biases the socket to rotate shelf 19 out of alignment with the walls of the socket receptacle 24.

Referring now to FIG. 2, there is illustrated in elevational view, a driver 38 and a socket 40 suitable for fastening of aerospace fasteners. The driver 38 is of conventional construction and is shown in phantom lines. The driver has a rotationally driven socket receptacle member 50 (in solid lines).

The socket 40 has a center through channel 42, which receives a key holder 46 having a key receptacle 47 which receives a hexagonally flatted key 44 that secures in the end of the bolt of the fastener to immobilize a fastener bolt in a blind or non-interference application. The socket 40 is of conventional construction having a standard socket 58 having internally hexagonally flatted walls 49 to secure the locking collar of an aerospace fastener. The shank end 48 of the socket 40 is also hexagonally flatted and is received in the socket receptacle 51 of the member 50.

The socket 40 is modified in accordance with this invention by providing a plurality of additional flats at an angular increment of about 15 degrees from the internal flats of the receptacle 51. A thin shelf 52 is formed at the end of the socket and this shelf has a flatted surface that matches the internal walls of socket 52. This structure is shown in FIGS. 3 and 4. In the illustration, the socket 40 has rotated relative to the receptacle 51, with the shelf 52 entering an annular groove 53 in the side walls of the receptacle 51.

Preferably, the shank end 48 of the socket 40 has an external annular groove 54 at an intermediate position along its length to receive a conventional elastic 0-ring 56 and the like that will serve for resiliently retaining the socket 40 in the driver 38. This can be used with large, heavy sockets to prevent their accidental dislodgment when in the null position, i.e., with the flats of the shelf 52 aligned with the internal flats of the socket receptacle 51.

The socket receptacle 51 of member 50 in the driver 38 permits insertion of the shank end 48 of the socket 40 a sufficient distance for the shelf 52 to align with the annular groove 53 on the inside walls of the receptacle 51. Since the remainder of the shank has a hexagonal pattern angularly displaced from that of the shelf 52, the socket 40 can then be rotated slightly relative to the member 50 with shelf 52 entering groove 53. This rotation, approximately 15°, in either direction, will move the shelf 52 out of alignment with the internal walls of the socket receptacle 51, and prevent extraction of the socket 40 from the socket receptacle 51.

The socket 40 can be removed by releasing the rotational force or load on the socket, and then rotating the socket 40 within its receptacle 51 in the opposite direction, until the shelf 52 aligns with the internal side walls of the socket receptacle 51 and permitting extraction of the socket 40.

As shown in FIG. 4, the annular groove 53 provides shoulders such as 62 which serve as axial abutments to retain the shelf 52, which appears in sectioned view in the illustration, and which is shown out of alignment with the hexagonal sectioned flatted socket receptacle 51 of the member 50 of driver 38.

An end view of the socket 40 appears in FIG. 5 and it is apparent that the socket 40 is fairly conventional in construction with a socket 58 having hexagonally flatted side walls 49 to receive the locking collar of an aerospace fastener. A central key 44 is received in the key holder 46 to restrain a bolt in a non-interference fit application.

Figure 6:
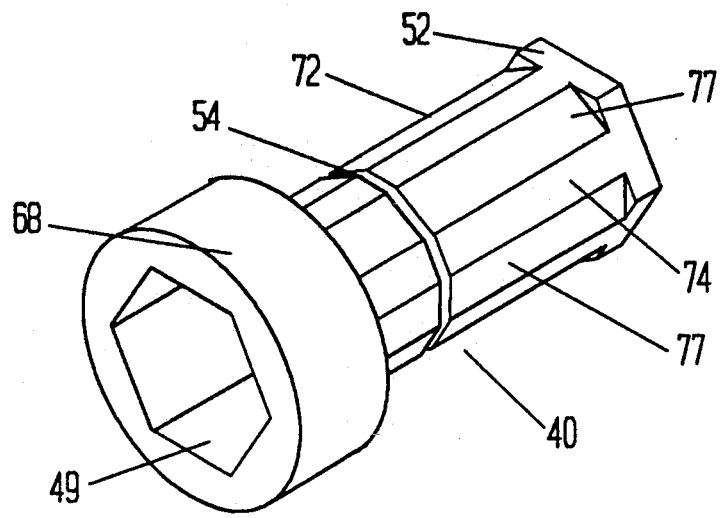
FIG. 6 is a perspective view of the socket of FIG. 2.
Figure 7:
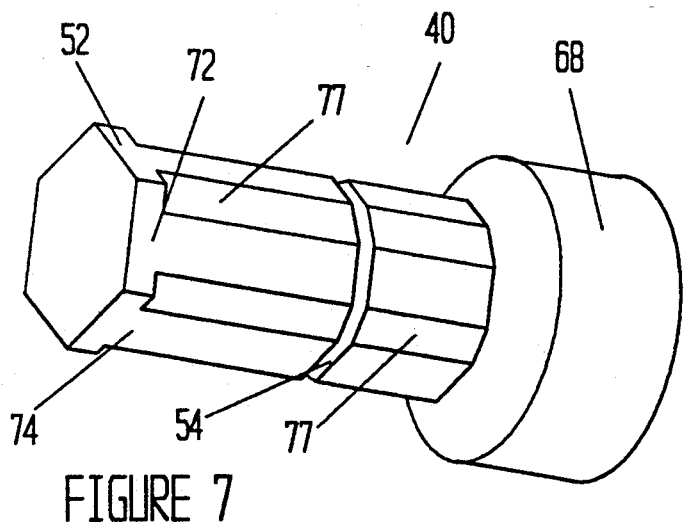
FIG. 7 is a perspective view of the socket of FIG. 2 reversed from the view shown in FIG. 6.

The socket 40 is shown in greater detail in FIGS. 6 and 7. As there illustrated the socket 40 has a cylindrical base 68 with a shank 72. The shank 72 has wrenching flats 74, and is preferably hexagonal in cross section, and is provided with the aforementioned angularly displaced flats 77 which extend substantially coextensively with flats 74 along the length of the shank 72. The flats 77 are slightly lesser in length than flats 74, to provide shelf 52 distally located on shank 72. The shelf 52 can be located at any point along the length of shank 72, depending on the location of the annular groove 53 (see FIG. 3) in the socket receptacle 51 of member 50. Also, the annular groove 54 about the shank is shown in the illustrations, and this groove receives an elastic 0-ring, which serves to provide added security of the retention of the socket in the driver. Alternatively, a spring biased member such as the spring biased ball detent, shown in FIG. 1 can be used for this purpose.

Figure 8:
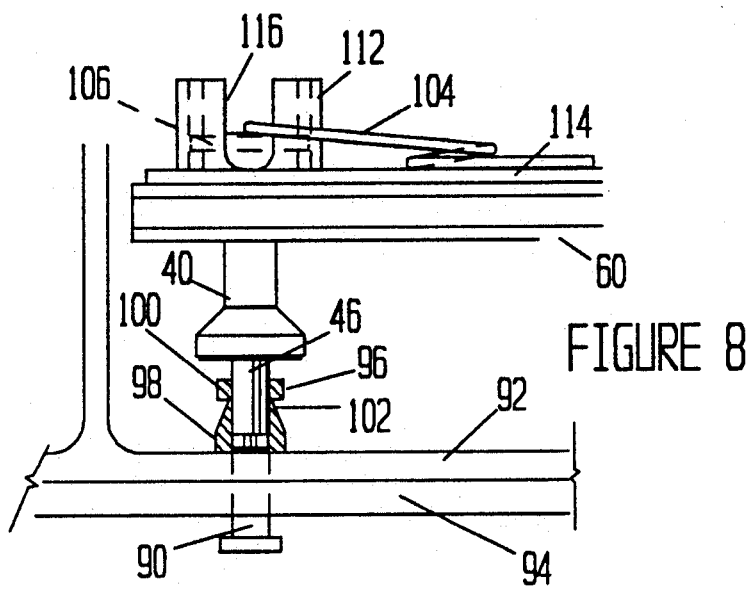
FIG. 8 is an elevational view of a socket and driver as used to secure a locking collar to a fastener, typical of aerospace applications.
Figure 9:
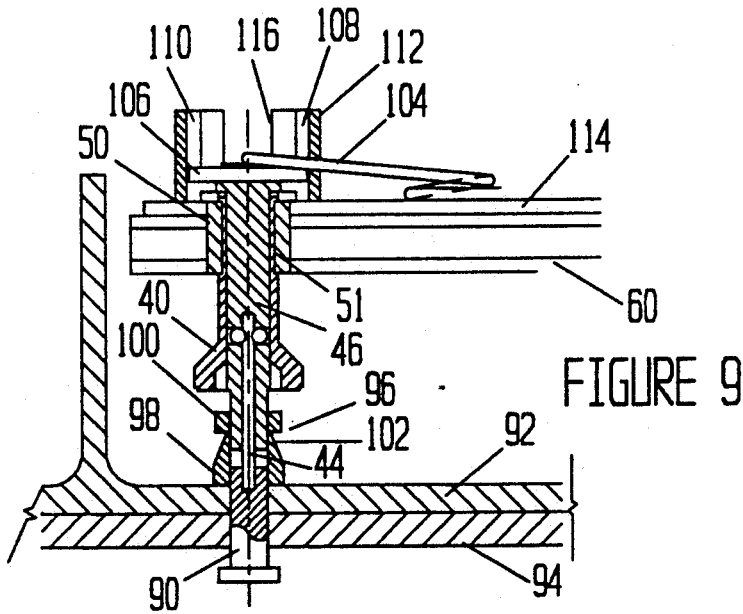
FIG. 9 is a sectional view of the driver and socket shown in FIG. 8.

Referring now to FIGS. 8 and 9, the socket and driver of the invention are shown in an application to secure a locking collar of an aerospace fastener. The fastener has a bolt 90 which extends through aligned apertures in the work piece, plates 92 and 94. The fastener nut 96 is of conventional construction having an internally threaded base 98 and an upper collar 100 interconnected by a frangible neck 102. The socket 40 is received within the socket receptacle 51 of the rotatable member 50 and surrounds the key holder 46. The key 44 extends into a key receptacle in the end of the bolt 90, immobilizing the bolt. As the socket 40 is advanced onto the collar 100, from the position shown in FIGS. 8 and 9, the key holder 46 slidably retracts, moving upward in the illustration, against the resilient force of the spring arm 104. The key holder 46 is restrained against rotation within the socket member 40 by a pin 106 which extends through a bore in the upper end of the key holder 46, and which is in alignment with grooves 108 and 110 on the inside walls of the spring guide 112, which is a cylindrical shell rigidly secured to the arm 114 of the driver 60. A through slot 116 is provided in the shell wall to permit access of the spring arm 104, which lies on the top end of the key holder 46 and resiliently forces the key holder into its extended position.

Figure 10:
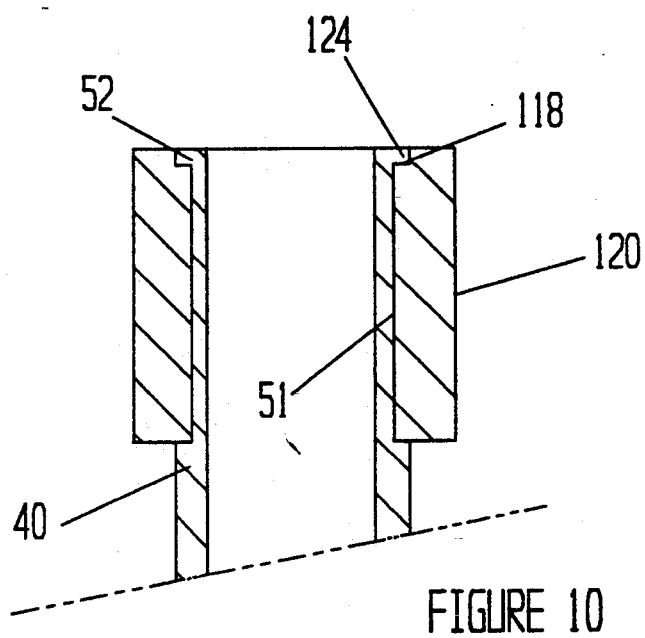
FIG. 10 is a view of an alternative interlock to prevent dislodgement of a socket used in the invention.

Referring now to FIG. 10, there is illustrated a tool holder 120 having a tool receptacle which receives the flatted shank of a tool. As with the socket 40 and tool holder 50 previously described with reference to FIGS. 2-9, the socket receptacle 51 has wrenching flats, preferably with a hexagonal cross section, and the shank of the tool is also hexagonally flatted. The portion of the shank of the tool which is received within the tool socket, however, is provided with the aforementioned additional flats, which are angularly displaced from the hexagonal flats by an angle of about 15 degrees, permitting the tool shank to rotate slightly in the tool socket. As previously mentioned, a shelf of hexagonal flats is distally provided on the tool shank, and this seats in the recess 118 at the upper end of the tool holder 120.

Figure 11:
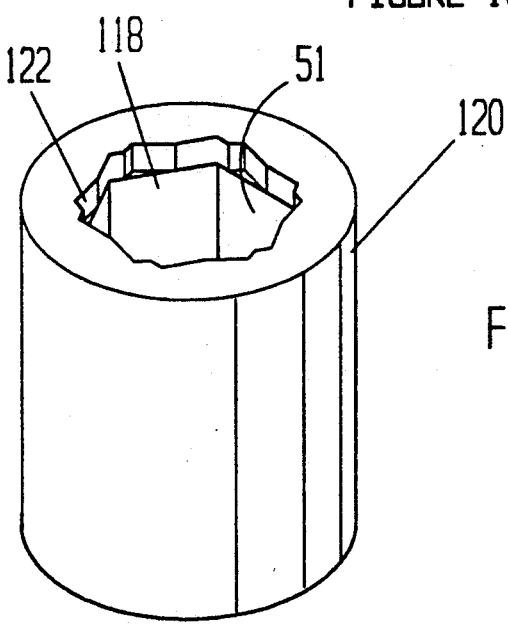
FIG. 11 is a perspective view of the end of the tool holder of FIG. 10, illustrating the interlock.

In this application with the driver shown in FIGS. 2-7, the spring arm 114 (FIGS. 8 and 9) bears downwardly against the end of the tool, biasing the shelf 52 into the recess 118. As shown by FIG. 11, which is an end view of the holder 120, the recess 118 has the same cross section as the shelf 52 and has a plurality of triangular niches 122 which align with the edges 124 of the shelf 52, thereby restraining the shelf against rotation within the recess. The tool 40 can only be rotated into its null position (where shelf 52 is aligned with the walls of the socket receptacle) by raising the tool 40 in the holder 120 to remove the shelf 52 from the recess 118, and then by turning the tool shaft to align the shelf 5 with the walls of the tool cavity 51.

Referring now to FIG. 12, the invention is shown as applied to a screwdriver bit 130 which has a hexagonally flatted shank 132 and which is received within the tool receptacle 138 in the driver tool holder 134 that is supported on the end of a power driver or hand grip 136. In this application, the tool receptacle 138 within the driver tool holder 134 is provided additional flats 140 adjacent to each of the hexagonal flats 142 (which match the cross section of the tool shank 132) but displaced angularly therefrom by a slight degree, from 15 to 30 degrees. The tool holder 134 also has a retainer plate 144 having a central aperture 146 with a hexagonal cross section matching the cross section of the tool shank 132. This plate 144 is permanently secured to the end face 148 of the tool holder 134. The lower end 150 of the tool shank 132, beneath annular groove 152, is received in the tool holder receptacle 138, and rotation of the holder 134 will cause rotation of the tool shank 132 within the holder 134, whereby the tool shank is restrained within the holder by the retainer plate 144.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The combination of a tool driver and a tool for removable retention in said tool driver in which the tool has a tool shaft and a working end with a wrenching portion having at least one flatted wrenching surface on said tool shaft at its end opposite said working end and said tool driver has a tool holder with a tool receptacle having a cross section matching the flatted wrenching surface of said tool shaft and receiving therein said tool shaft, the improvement which comprises: an angularly offset flatted surface on one of said tool receptacle and tool shaft which is adjacent to and extends substantially but not completely coextensive with each one of said flatted wrenching surfaces and which is angularly disposed therefrom through an angular increment from about 5 to about 45 degrees thereby forming a flatted wrenching portion having twice the flatted surfaces as the other of said tool receptacle and tool shaft and a shelf portion located along the length of said one of said tool receptacle and said tool shaft which shelf portion has a cross section substantially matching the cross section of the other of said tool receptacle and tool shaft and an annular groove on the other of said tool receptacle and tool shaft at a location along its length which is aligned with said shelf portion when said tool shaft is received within said receptacle whereby said tool shaft may be rotated through said angular increment, thereby locking said tool shaft within said receptacle.

2. The combination of claim 1 wherrein said angularly offset flatted surfaces are on said tool shaft.

3. The confirmation of claim 2 wherein said wrenching surface comprises wrenching flats.

4. The combination of claim 3 wherein said wrenching flats provide a dodecagonal cross section on said wrenching portion of said tool shaft, and said tool receptacle has a hexagonal internal cross section.

5. The combination of claim 2 including an annular groove about the wrenching portion of said tool shaft to receive an elastic O-ring for resilient retention of said socket in said socket receptacle of said driver.

6. The combination of claim 1 including a second annular groove about the wrenching portion of said tool shaft, and including an elastic O-ring seated therein and in resilient engagement with the internal sidewalls of said socket receptacle of said driver.

7. The combination of claim 5 including a second annular groove, which is located about the wrenching portion of said tool shaft, and including an elastic O-ring seated therein and in resilient engagement with the internal sidewalls of said socket receptacle of said driver.

8. The combination of claim 1 including a detent member seated in a detent receptacle in the sidewall of said socket receptacle and including resilient means biasing said detent member against the wrenching portion of said tool shaft to urge said shaft into rotation through said angular increment.

9. The combination of claim 8 wherein said detent member is a spring biased ball detent.

10. The combination of claim 1 wherein said angularly offset flatted surfaces are on the internal surfaces of said tool receptacle.

11. The combination of a tool driver and a tool for removable retention in said tool driver in which the tool has a tool shaft and a working end with a wrenching portion having at least one flatted wrenching surface on said tool shaft at its end opposite said working end and said tool driver has a tool holder with a tool receptacle comprising a through channel having a cross section matching the flatted wrenching surface of said tool shaft and receiving therein said tool shaft, the improvement which comprises: an angularly offset flatted surface on said tool shaft which is adjacent to and extends substantially but not completely coextensive with each one of said flatted wrenching surfaces and which is angularly displaced therefrom through an angular increment from about 5 to about 45 degrees, thereby forming a flatted wrenching portion having twice the flatted surfaces as the other of said tool receptacle and tool shaft and a shelf portion located at the end of said tool shaft which shelf portion has a cross section substantially matching the cross section of the other of said tool receptacle and tool shaft with said shaft having a length greater than the length of said through channel of said driver, whereby said shelf can extend through said through channel and be rotated through said angular increment to lock said tool to said driver.

12. The combination of claim 11 wherein said wrenching surface comprises wrenching flats.

13. The tool of claim 12 wherein said wrenching flats provide a dodecagonal cross section to said wrenching portion of said tool shaft, and said tool receptacle has a hexagonal internal cross section.

14. The combination of claim 11 including a detent member seated in a detent receptacle in the sidewall of said socket receptacle and including resilient means biasing said detent member against the wrenching portion of said tool shaft to urge said shaft into rotation through said angular increment.

15. The tool of claim 14 wherein said detent member is a spring biased ball detent.

16. The combination of claim 11 wherein said tool receptacle has an annular groove in its internal side walls and said shelf portion is located on said tool shaft at a position aligned said annular groove, when said shaft is placed in said receptacle whereby said shelf can be rotated within said annular groove, through said angular increment to lock said tool to said driver.

* * * * *

UNITED STATES PATENT AND TRADEMARK OFFICE
CERTIFICATE OF CORRECTION

PATENT NO. : 5,257,557
DATED : Nov. 2, 1993
INVENTOR(S) : Ronald W. Batten

It is certified that error appears in the above-identified patent and that said Letters Patent is hereby corrected as shown below:

On title page, in the heading and on title page, item [75], correct spelling of Inventor's name to: Ronald W. Batten In the Claims:

In claim 3, line 6, delete "confirmation" and insert therefor, - - combination - -

Signed and Sealed this

Twenty-seventh Day of June, 1995

Attest:

BRUCE LEHMAN

Attesting Officer

Commissioner of Patents and Trademarks